United States Patent [19]

Kobayashi et al.

[11] 4,402,755

[45] Sep. 6, 1983

[54] GELATIN HARDENING METHOD AND AGENTS THEREFOR

[75] Inventors: Morio Kobayashi; Takashi Sasaki, both of Hino, Japan

[73] Assignee: Konishiroku Photo Industry Co., Ltd., Tokyo, Japan

[21] Appl. No.: 414,916

[22] Filed: Sep. 3, 1982

Related U.S. Application Data

[63] Continuation of Ser. No. 177,370, Aug. 12, 1980, abandoned.

[30] Foreign Application Priority Data

Aug. 14, 1979 [JP] Japan .............................. 54-102814

[51] Int. Cl.$^3$ .............................................. C09D 3/04
[52] U.S. Cl. .................................... 106/125; 260/117
[58] Field of Search ......................... 106/125; 260/117

[56] References Cited

U.S. PATENT DOCUMENTS

| | | | |
|---|---|---|---|
| 2,732,303 | 1/1956 | Morgan et al. | 95/7 |
| 2,732,316 | 1/1956 | July et al. | 106/125 |
| 3,321,313 | 5/1967 | Burness et al. | 96/111 |
| 3,454,551 | 7/1969 | Mangini et al. | 260/153 |

*Primary Examiner*—Lorenzo B. Hayes
*Attorney, Agent, or Firm*—Jordan B. Bierman; Linda Bierman

[57] ABSTRACT

A method for hardening gelatin which involves reacting the gelation with a partially hydrolyzed dichloro-s-triazine derivative.

5 Claims, No Drawings

GELATIN HARDENING METHOD AND AGENTS THEREFOR

This Application is a continuation of Application Ser. No. 177,370, filed Aug. 12, 1980, now abandoned which claims Priority of Japanese Application Ser. No. 102814/1979 filed on Aug. 14, 1979.

This invention relates to gelatin hardening methods and agents therefore particularly suitable for hardening gelatin film layer of photographic materials.

An improvement of the physical property of gelatin has so far been tried in such a manner that various hardening agents act upon gelatin and then reacts by cross-linking upon the functional group in gelatin molecules such as amino group, carboxyl group, amido group, etc. As for such the hardening agents, the following examples are given and known; compounds having reactive halogen atom as described in the U.S. Pat. Nos. 3,288,775 and 2,732,303, the British Pat. Nos. 974,723 and 1,167,207, the French Pat. No. 2001599, the Japanese Patent Publication Nos. 47-6151, 48-13709, Japanese Patent L-O-P Publication Nos. 53-139689 etc.; compounds having reactive olefin as described in the U.S. Pat. Nos. 3,635,718, 3,232,763, the British Pat. No. 994,809; N-methylal compounds as described in the U.S. Pat. Nos. 2,732,316 and 2,586,168; azilidine compounds as described in the U.S. Pat. Nos. 3,017,280, 2,983,611; active ester compounds as described in the Japanese Patent Publication No. 53-22089, Japanese Patent L-O-P Publication Nos. 53-118486, 54-7320, etc.; carbodiimide compounds as described in the U.S. Pat. No. 3,100,704; epoxy compounds as described in the U.S. Pat. No. 3,091,537; isoxazole compounds as described in the U.S. Pat. Nos. 3,321,313, 3,543,292; halogen carboxy aldehydes such as mucochloric acid; dioxanes such as dihydroxy dioxane, dichlorodioxane, etc.

However, those known hardening agents has some fault or other when used in the photographic materials especially the photographic materials are effected by the rapid at high temperature processing of photographic materials. For example, when an amount of an additive is increased for the purpose of obtaining the stronger physical property of gelatin, such various faults as an increase of fog, lowering a covering power, or the brittleness of the coated film are caused.

Cyanuric chloride is proposed to be used as a hardening agent. However, this compound has the undesirable nature that not only an undesirable increase of viscorsity is caused in a short period after adding therewith into gelatin solution, but also an irreversible coagulation is caused therein, due to the extremely great reactivity of this compound. In the French Pat. No. 2,001,599, dichloro-s-triazine derivatives is disclosed, but those hardening agents have a low water-solubility, therefore the agents are hardly used unless the agent is dissolved in a organic solvent in order to add into a photographic constitution elements. Particularly in case that an abundance of organic solvent exist in such a photographic constitution elements, it often occurs that gelatin is aggregated and precipitated to cause a coating trouble and in a multi-layered film such as color photographic material, a mass intertransfer between the layers is caused and thereby it becomes the cause of color turbidity. And in the case that a solvent with a high boiling point is used in order to dissolve the said agent, it is apt to cause such troubles that the period of time to dry up the coated film is delayed with that the lowering of the coated surface strength, worsening of the photographic characteristics in preservation and interactive adhesion of the coated surfaces are apt to cause due to the remaining of solvents in the coated film even after dried up. And further the usage of organic solvents is called into the safety and environmental problems of the production process. Thereafter, the following proposals have been done relating to cyanuric chloride hardening agents which have the superb water-solubility; 2,4-dichloro-6-sulfoanilino-s-triazine as described in the Japanese Patent Publication No. 39-16928; water soluble salts of 2,4-dichloro-6-hydroxy-s-triazine as described in the Japanese Patent Publication 47-6151; water solution of partially hydrolyzed product of 2,4-dichloro-6-alkoxy-s-triazine as described in the U.S. Pat. No. 4,187,114.

Those of the above hardening agents are the ones which the faults of the said cyanuric chloride hardening agents have been considerably improved, and which complete the gelatin hardening reaction faster than those of the types of gelatin hardening agents, and yet it takes several dyes to complete the hardening of gelatin. Therefore, the after-hardening phenomenon exists if the said agents are applied into the layers constituting a photographic sensitized material. And, it can not be determined that the physical property thereof is satisfactory to be used with the high temperature rapid processing and the automatic processing by means of the high potency processing solutions which are being popularized in recent years.

It is an object of the invention to provide a novel hardening agent hardening gelatin.

Another object of the invention is to provide a hardening agent of which the aforedescribed advantages can be obtained by improving almost all faults regarded as those of the conventional hardening agents, and at the same time to provide a gelatin hardening method that is suitable to harden gelatin, particularly gelatin film of photographic sensitized material by making use of the hardening agent of the invention.

Other objects of the invention are described more concretely hereinafter.

The hardening agent to be used in the present invention works at a desirable speed therefore it does not cause to increase the viscorsity of gelatin solution until the time of forming a coated layer from the gelatin solution after addition of the hardening agent, nevertheless the after-hardening phenomenon does not exist substantially, because the hardening reaction occurs very quickly during the drying period after the coated film is formed. Therefore, the photographic material produced by making use of the said hardening agent has the uniform strength of gelatin film right after the said material is produced. Upon this, in comparison between the material right after produced and the one after aged, there is not a difference in observed sensitivity and color balance changes between the two, because penetrating speed of the developer is not different from each other while processing. And, the strength of gelatin film of photographic material produced by making use of the said hardening agent, is extremely strong in comparison with that by making use of the conventional hardening agent aforedescribed, therefore it can be obtained the physical property applicable enough to the high temperature rapid processing and the automatic processing by means of a caustic processing solution.

Further, the hardening agent to be used in the present invention has the extremely high water-solubility. This fact bears a significant meaning, that is, if an organic solvent has to be used as an additive in a hardening agent in producing photographic material, due to the low water solubility, various disadvantages as aforedescribed are unavoidable.

Further, granting that it has a little water solubility, the more an abundance of water is needed for adding a hardening agent, the heavier the load to dry up water becomes. This is not only the energetic loss but also needs more spaces and equipments for drying operations and also lowers the productivity. And further, the photographic materials have been produced more rapidly in recent years, for instance, when the extrusion coating is done by using a slide counter, a certain high degree of viscorsity is needed for a coating composition, however, the fact, that an abundance of water is added for adding with a hardening agent, tends to lower the viscorsity as a matter of course, and becomes a fatal fault as the case may be. Therefore, the fact that the water solubility of a hardening agent is high is of the extremely important advantage for an industry skilled in the art and further the hardening action per weight unit of the said hardening agent is extremely great, therefore adding amount thereof can be less than that of other types of hardening agents and a required amount of water can further be reduced accordingly.

Furthermore, the hardening agent to be used in the present invention has no interaction with the other coexisting additives for photographic use, for example, color-coupler. Moreover, the worsening actions (e.g. a fog increase, a lowering of sensitivity, etc.) do not influence upon the nature of photograhic material.

In addition, a substance which can be hardened by the hardening agent of the invention is not limited to gelatin only, but similar to gelatin, hydrophilic polymer substances having primary or secondary amino group or a mixture with gelatin can also be hardened by the hardening agent of the invention.

The hardening agent of our invention is a pertially hydrolyzed product of dichloro-s-triazine derivative represented by the following formula [I]

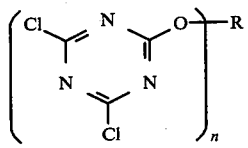

[I]

wherein, n has an integer of two or more, R represents n valent organic group.

In the general formula, for further particulars, R represents an n valent aliphatic, aromatic (e.g. benzene ring, naphthalene ring, etc.), 5 or 6 membered heterocyclic group containing a nitrogen, oxygen or sulphur atom (e.g. pyrole ring, pyrrolidine ring, pyridine ring, pyrimidine ring, furan ring, pyrane ring, thiophene ring), 5 or 6 membered alicyclic group, or a combined group thereof.

Each of those groups may either have a substituent or combine with each other through hetero atom, for example, a nitrogen, oxygen and/or sulphur atom, or a carbonyl group.

As for the hardening methods to make an action, it is taken the following methods that the hardening agent is added into liquid containing gelatin and then coating and drying are successively done, and that the matter produced by preliminary reaction of hardening agent with gelatin is added into the coating composition and then coating and drying are successively done, and that a layer is made by coating with the coating composition containing the said hardening agent onto the layer which had once been made by coating, and is dried up, and that a constituting layer is formed by coating and then the said element is soaked into the solution in which the hardening agent is contained, and further that the soaking is done in the solution containing the said hardening agent before or on the way the developing process, etc.

Dichloro-s-triazine derivative which is the raw material of the hardening agent in the invention is synthesized from a cyanuryl chloride and polyhydroxy compounds by making use of inorganic alkali such as sodium bicarbonate, sodium carbonate, potassium carbonate, sodium hydroxide, and potassium hydroxide, or organic base such as triethylamine, pyridine, 2,4,6-collidine, etc., by the method similar to those as described in the Journal of American Chemical Society, vol. 78, 1951, page 2989 and in the U.S. Pat. No. 3,454,551.

Polyhydroxy compounds which are parts of the raw materials of dichloro-s-triazine derivative are well known. The following are to be used in the undermentioned examples of dichloro-s-triazine derivative; ethyleneglycol, trimethyleneglycol, trimethylolethane, diethyleneglycol, methyldiethanolamine, triethanolamine, 2,2'-thiodiethanol, dihydroxyethylsulfone, dihydroxyacetone, resorcine, hydroquinone, bis(p-hydroxyphenyl) methane, 1,5-dihydroxynaphthalene, 1,4-cyclohexanedimethanol, α,α'-dihydroxy-p-xylene, pentaerythritol, N,N,N',N'-tetra(2-hydroxyethyl)ethylendiamine, and besides the above, the followings are examples of polyhydroxy compounds; tetramethyleneglycol, pentamethyleneglycol, hexamethyleneglycol, propyleneglycol, triethyleneglycol, tetraethyleneglycol, pentaethyleneglycol, dipropyleneglycol, trimethylolpropane, 1,2,3-trihydroxybutane, 1,2,6-trihydroxyhexane, N,N,N'N'-tetra(2-hydroxypropyl)ethylenediamine, 1,2-bis(hydroxyethylthiomethyl)ethane, 1,1,1-tris(hydroxyethylthiomethyl)ethane, 1,1,1-tris(hydroxyethylthiomethyl)propane, tetrakis(hydroxyethylthiomethyl)methane, 1,2-bis(hydroxyethylsulfonylmethyl) ethane, 1,1,1-tris(hydroxyethylsulfonylmethyl)ethane, 1,1,1-tris(hydroxyethylsulfonylmethyl)propane, tetrakis(hydroxyethylsulfonylmethyl)methane, 2,6-dihydroxytoluene, phloroglucine, 2,4-dihydroxyacetophenone, 2,4-dihydroxybenzoic acid, diethanolanilene, 2,2',4,4'-tetrahydroxybiphenyl, 1,3-dihydroxynaphthalene, 1,4-dihydroxynaphthalene, 1,7-dihydroxynaphthalene, 1,8-dihydroxynaphthalene, 2,6-dihydroxynaphthalene, 2,7-dihydroxynaphthalene, 1,5-dihydroxy-1,2,3,4-tetrahydronaphthalene, 1,3-dihydroxycyclopentane, 1,4-dihydroxycyclohexane, 2,6-dihydroxypyridine, succharides, e.g., D-glucose, D-galactose, maltose, succharose, etc., synthesized polymers having hydroxyl group, e.g., polyvinyl alcohol, copolymerized substances of polyvinyl alcohol and other monomer.

In the above formula [I], n is not limited if n is an integer of two or more, however from the viewpoint of synthesis (i.e., easy procurement of raw materials, easy refining of intermediates, easy partial hydrolysis, etc.) it is desirable that R is n valent aliphatic group having 2-10 carbon atoms (nitrogen atom, oxygen atom and/or sulphur atom may be contained in carbon chain thereof) or 5- or 6-membered alicyclic group, or an aromatic group, particularly an n valent group which is induced from benzene ring or naphthalene ring of which n is 2, 3 or 4. In more preferably embodiment of the present invention, n is 2 and R represents an alkylene group (in whose carbon chain an oxygen atom may be contained), a 5- or 6-membered alicyclic group or an m- or o- phenylen group.

Next, the following are given as the outstanding examples of dichloro-s-triazine derivatives which are the raw materials of the hardening agent.

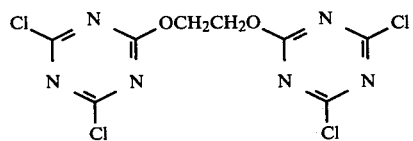
1.

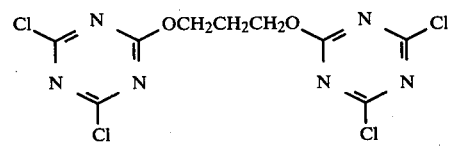
2.

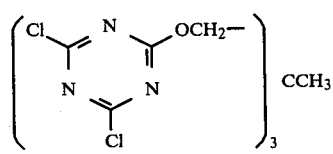
3.

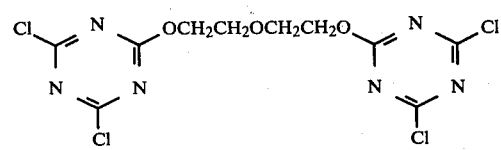
4.

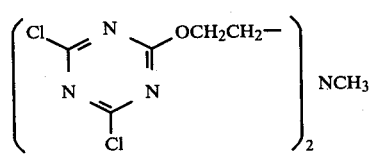
5.

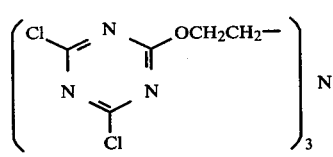
6.

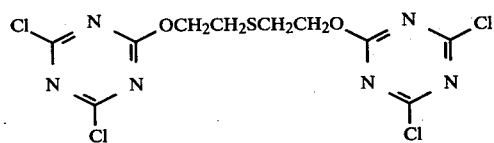
7.

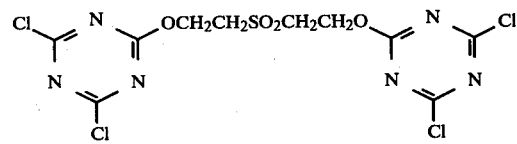
8.

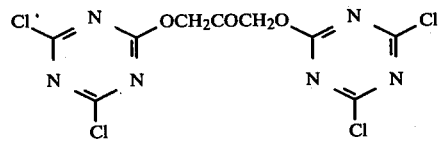
9.

10.
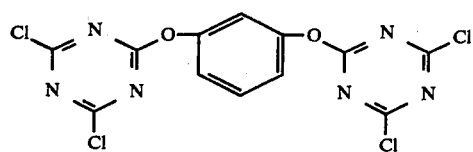
11.
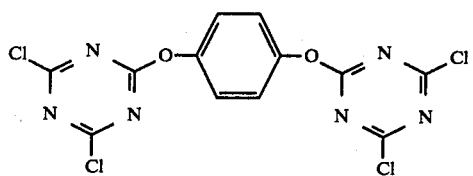
12.
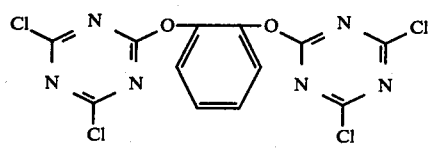
13.
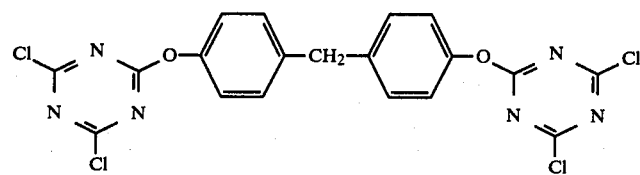
14.
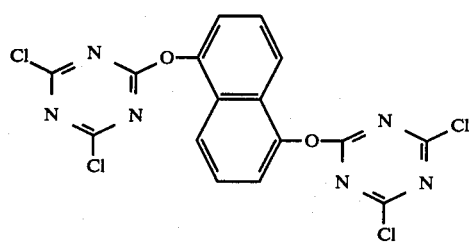
15.
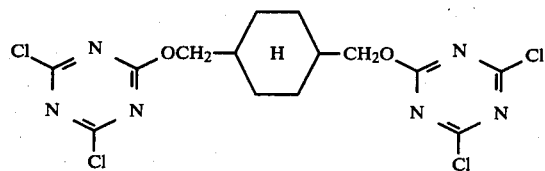
16.
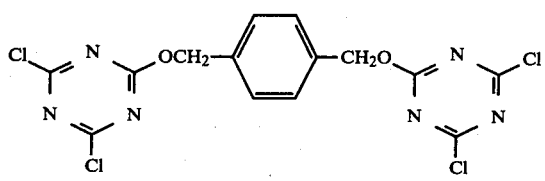
17.
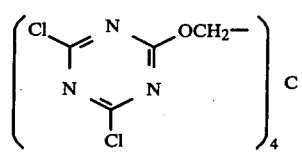

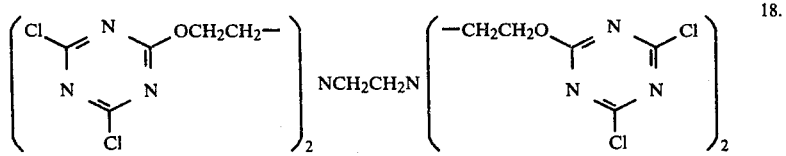

18.

The hardening agent of the present invention can be obtained in the manner that the dichloro-s-triazine derivative is processed, in order to partially hydrolyze, with alkali, for example, aqueous solution of sodium bicarbonate, sodium carbonate, potassium carbonate, sodium acetate, sodium hydroxide, potassium hydroxide, trisodium phosphate, tripotassium phosphate, triammonium phosphate, sodium metaborate and/or potassium metaborate, preferably at the room temperature or under 50° C. In the above case, dichloro-s-triazine derivative may be processed by adding as it is into alkaline solution, or may be processed by adding into alkaline solution after dissolving in organic solvent, e.g. acetone or dioxane. And, the amount of alkali to be used with 1 mol of dichloro-s-triazine derivative is 1 to 6 times n equivalents (n has the same meaning with that of n in the above formula [I]), however, from the viewpoints of the speed of the partial hydrolysis and the preservability of partially hydrolyzed product to be obtained, the preferable amount of alkali is 2 to 4 times n equivalents. One of the chlorine atoms in the formula [I] may be hydrolyzed with the alkaline. Termination of the partial hydrolyzation is easy to know, for example, by observing a change of turbidity of reacting composition because water soluble result is produced by the reaction. Degree of hydrolyzation is confirmed by titration of consumed alkali.

In addition, the solution of the partially hydrolyzed product obtained may be used as it is or by diluting with water up to the suitable concentration thereof, and if the solution contains organic solvent, it may be used after it will be distilled the organic solvent off or by diluting with water up to the suitable concentration. If a case demands, it may also be used after it is dried to powder.

If dichloro-s-triazine derivative is synthesized from cyanuric chloride and polyhydroxy compound by using inorganic alkali, the hardening agent, of which the raw material is dichloro-s-triazine derivative, to be used in the invention, can also be obtained without isolating but by successive processing with the said alkaline solution.

In case the hardening agent of this invention is added to the coating composition for forming a gelatin layer, the amount to be added is generally $5 \times 10^{-7} - 2.5 \times 10^{-3}$ mol and preferably $5 \times 10^{-6} - 2.5 \times 10^{-4}$ mol for the weight of 1 g of dry gelatin concerning gelatin in the coating composition and it may vary according to the kind of gelatin layer, physical properties and photographic characteristics to be targeted. Further, the said hardening agent can be added at any time during the preparation of the coating composition for forming a gelatin layer and in case it is added to the silver halide emulsion, it is preferable to add after the second ripening of the silver halide emulsion in general.

This invention can be applied to any type of photographic material containing a gelatin layer, for example, a silver halide photographic material.

As a support for photographic material to which the hardening method of this invention is applied, paper, laminated paper, glass, celluloseacetate, celluloseni-trate, polyester, polyamide, film of polystyrene etc. and sheet are used and they are selected according to the purpose of the sue of photographic material.

In case the gelatin layer of silver halide photographic material is acted by the hardening agent according to this invention, photographic characteristics such as fog and sensitivity etc. and storability are not damaged and effective hardening power is shown since there is substantially no after-hardening with aging. Further, for the preservation of photographic material for a long time, there is no bad influence upon photographic emulsion and effective stability is given and further an excellent hardening power that is fully resistant to high temperature rapid processing and automatic processing, is given.

Hardening agent of this invention can either be used alone or in combination with ore than two kinds or it can be used together with the aforesaid known hardening agent.

A distinctive feature of the hardening method of this invention is more exhibited in the case in which the high technology like the one for color photographic material is especially required. As mentioned above, time required by color development used in processing of color photography photosensitive material is longer than that of black and white development and total processing time is long since it is common that bleach treatment is conducted. Besides, the first development is further necessary for processing of reversal color photosensitive material. Furthermore the processing of coupler in developer type color photosensitive material requires the repetition of color development for several times. Therefore, powerful hardening is required for color photographic material that is suitable for high temperature processing. With the hardening method of this invention, it is possible to make a layer that is fully resistant to the aforesaid processing. Further, the change caused by aging or heat treatment does not exist substantially and consequently it is possible to produce color photography photosensitive material that has no defect of excessive hardening and has stable performances.

Another distinctive feature of color photographic material is that the composition is complicated and various kinds of compounds are used therein. The hardening method of this invention will not cause any color obstacle that is often seen in case of using other hardening agent, even it is applied to color photographic material in which the couplers such as 5-pyrazolone magenta forming coupler, naphthol or phenol cyan forming coupler, open chain ketomethylene type yellow forming coupler of so-called 2 equivalent or 4 equivalent coupler of such yellow forming coupler and so-called masking coupler that has arylazo group at its coupling position, are used. Further, the hardening method of this invention is effective even it is applied to color photographic material that contains ultraviolet rays absorbing agent, brightening agent, mordant layer, dye developer and further development inhibitor releasing compound.

Next, the typical preparation examples of hardening agent used for this invention are shown as follows.

Preparation example 1

In 400 ml of water, 26 g of sodium hydrogen carbonate is dissolved and into this solution, with stirring thereof at 40° C., 400 ml solution of acetone with 25 g of 2,2'-(ethylenedioxy)bis[4,6-dichloro-s-triazine] (Exemplified compound 1.) is dropped. After dropping thereof, the solution is stirred for 3 hours at the same temperature until triazine compound has been thoroughly dissolved. Then the solution is filtrated and acetone is distilled under diminished pressure and water is added so that the total volume of 700 ml is obtained.

Preparation example 2

In 450 ml of water, 66 g of trisodium phosphate (12H$_2$O) is dissolved and into this solution, with stirring thereof at 35° C., 400 ml solution of acetone with 25 g of 2,2'-(ethylenedioxy)bis[4,6-dichloro-s-triazine] (Exemplified compound 1.) is dropped. After dropping thereof, the solution is stirred for 5 hours at the same temperature until triazine compound has been thoroughly dissolved. Then the solution is filtrated and acetone is distilled under diminished pressure and water is added so that the total volume of 700 ml is obtained.

Preparation example 3

In 500 ml of water, 42 g of sodium metaborate (4H$_2$O) is dissolved and into this solution, with stirring thereof at 40° C., 400 ml solution of acetone with 25 g of 2,2'-(ethylenedioxy)bis[4,6-dichloro-s-triazine] (Exemplified compound 1.) is dropped. After dropping thereof, the solution is stirred for 5 hours at the same temperature until triazine compound has been thoroughly dissolved. then the solution is filtrated and acetone is distilled under diminished pressure and water is added so that the total volume of 700 ml is obtained.

Preparation example 4

In 400 ml of water, 27 g of sodium hydrogen carbonate is dissolved and to this solution, with stirring thereof at 40° C., 30 g of 2,2'-(m-phenylenedioxy)bis[4,6-dichloro-s-triazine] (Exemplified compound 1.) is added little by little for about 1 hour. Until triazine compound has been thoroughly dissolved, the solution is stirred at the same temperature for 5 hours. Then the solution is filtrated and water is added so that the total volume of 740 ml is obtained.

Preparation example 5

In 400 ml of water, 56 g of trisodium phosphate (12H$_2$O) is dissolved and into this solution, with stirring thereof at 40° C., 400 ml solution of acetone with 30 g of 2,2'-(m-phenylenedioxy)bis[4,6-dichloro-s-triazine] (Exemplified compound 1.) is dropped. After dropping thereof, the solution is stirred for 6 hours at the same temperature until triazine compound has been thoroughly dissolved. Then the solution is filtrated and acetone is distilled under diminished pressure and water is added so that the total volume of 740 ml is obtained.

Preparation example 6

In 400 ml of water, 57 g of trisodium phosphate (12H$_2$O) is dissolved and into this solution, with stirring thereof at 40° C., 300 ml solution of acetone with 28.2 g of 1,1,1-tris (4,6-dichloro-s-triazine-2-yl oxymethyl)ethane (Exemplified compound 1.) is dropped. After dropping thereof, the solution is stirred for 4 hours at the same temperature until triazine compound has been thoroughly dissolved. Then the solution is filtrated and acetone is distilled under diminished pressure and water is added so that the total volume of 500 ml is obtained.

Next, this invention will be described more practically with examples but the embodiment of this invention will not be limited to such examples and various applications are possible.

EXAMPLE 1

Gold sensitizer and sulfur sensitizer were added to neutral negative use silver iodobromide emulsion containing silver iodobromide of 1.5 mol% and second ripening thereof was made. After adding thereto 4-hydroxy-6-methyl-1,3,3a,7-tetraazaindene as a stabilizer, diethyleneglycol as a humectant and saponin as a coating aid, it was divided into 8 portions and one portion thereof was coated onto polyester base and was dried to be a referential sample and to remaining 7 portions thereof, the following hardening agent for comparison (1), (2) and hardening agent of this invention (1), (2), (3), (4) and (5) were added respectively and they were coated onto polyester base and were dried to be the samples.

Hardening agent for comparison (1)
  Mucochloric acid
Hardening agent for comparison (2)
  Hardening solution obtained by the partial hydrolysis of 2,4-dichlor-6-methoxy-s-triazine in the solution of trisodium phosphate (12H$_2$O) with equivalent mol amount (hardening solution described in U.S. Pat. No. 4,187,114)
Hardening agent of this invention (1)
  Aqueous solution of preparation example 1
Hardening agent of this invention (2)
  Aqueous solution of preparation example 2
Hardening agent of this invention (3)
  Aqueous solution of preparation example 3
Hardening agent of this invention (4)
  Aqueous solution of preparation example 4
Hardening agent of this invention (5)
  Aqueous solution of preparation example 6

Hardening properties of these corresponding samples and of each sample were measured in the following method. Namely, for each with respect to the every series of the above samples, all of the samples were coated and dried, and then some specimens of the each series were preserved for the periods of 1, 3, 7 and 14 days respectively at the temperature of 25° C. and at the relative humidity of 55%, and the remaining specimen of the each series was heat-treated for a period of 3 days at the temperature of 50° C. and at the relative humdity of 80%, and all of them were soaked in 1.5% solution of sodium hydroxide being heated at 50° C., and then the time to commencing dissolution of the gelatin film thereof was measured. And the pieces of the specimens, which were respectively preserved and heat-treated under the same conditions, were soaked in 3% solution of sodium carbonate (1 H$_2$O) at 25° C. for 2 minutes of time, and immediately after that, the surface of the gelatin film is wiped off and scratched thereon with a sapphire stylus having a point of 1 mm radius of curvature, and the load at the time when a scar began to appear on the film surface was measured and the strength of film surface is represented thereby.

Table 1 shows the results thereof and the results of the measurement of the sensitivity and fog by the sensitometry done on the each sample which was preserved for a whole day long at 25° C. and at 55% of the relative humidity, after coating and drying thereof. Further, the sensitivity shown in the Table represents the relative value to that the sensitivity of the referential sample (Sample No. 1) is regarded at 100.

with the hardening agents of the invention (2), (6), (7) and (8) are prepared.

Comparison hardening agent (3)
(a) Acetone solution of 2,2'-(ethylenedioxy)bis[4,6-dichloro-s-triazine]
(b) Sodium hydrogen carbonate of equivalent molar

TABLE 1

| Sample No. | Added hardening agent | Adding amt. mili mol g gelatin | Hardening properties | | | | | | | | | | Photographic characteristics | |
|---|---|---|---|---|---|---|---|---|---|---|---|---|---|---|
| | | | Starting time for dissolution (min) | | | | | Strength of layer surface (g) | | | | | | |
| | | | 1 day preservation | 3 days preservation | 7 days preservation | 14 days preservation | 3 days heat-treatment | 1 day preservation | 3 days preservation | 7 days preservation | 14 days preservation | 3 days heat-treatment | Sensitivity | Fog |
| 1 | — | — | 0.5 | 0.5 | 0.5 | 0.5 | 0.5 | 2 | 2 | 2 | 4 | 4 | 100 | 0.15 |
| 2 | Comparison hardening agent (1) | 0.05 | 4 | 7 | 10 | 14 | 21 | 20 | 25 | 40 | 90 | 150 | 87 | 0.13 |
| 3 | Comparison hardening agent (2) | 0.1 | 14 | 23 | 27 | 30 over | 30 over | 105 | 150 | 180 | 245 | 290 | 90 | 0.15 |
| 4 | Hardening agent of this invention (1) | 0.05 | 30 over | 30 over | 30 over | 30 over | 30 over | 310 | 320 | 325 | 325 | 330 | 93 | 0.12 |
| 5 | Hardening agent of this invention (2) | 0.05 | 30 over | 30 over | 30 over | 30 over | 30 over | 340 | 350 | 350 | 350 | 350 | 95 | 0.11 |
| 6 | Hardening agent of this invention (3) | 0.05 | 28 | 30 over | 30 over | 30 over | 30 over | 305 | 325 | 330 | 330 | 335 | 93 | 0.11 |
| 7 | Hardening agent of this invention (4) | 0.05 | 29 | 30 over | 30 over | 30 over | 30 over | 315 | 325 | 325 | 335 | 330 | 92 | 0.12 |
| 8 | Hardening agent of this invention (5) | 0.033 | 30 over | 30 over | 30 over | 30 over | 30 over | 335 | 340 | 340 | 340 | 345 | 94 | 0.12 |

As is obvious from the Table 1, it proves that the hardening agent relating to the invention is superior in dissolution resistance against alkaline solution and strength of layer surface either in comparison with those of the compared hardening agents which have so far been known to the public, and also has the remarkably superior hardening function that the photographic characteristics are not harmed and that the substantial after-hardening due to the natural storage and the heat-treatment does not occur.

EXAMPLE 2

The referential sample is made so that the multi-layer film having the following layer structure can be made on the cellulose acetate film base, and no hardening agent can be contained in any of the layer thereof.

1st layer—Antihalation layer
2nd layer—Red-sensitive silver halide gelatin emulsion layer containing cyan coupler.
3rd layer—Gelatin intermediate layer
4th layer—Green-sensitive silver halide gelatin emulsion layer containing magenta coupler and the developing inhibitor releasing compound as described in the Japanese Patent Publication No. 51-16141.
5th layer—Filtering layer containing yellow colloidal silver.
6th layer—Blue-sensitive silver halide gelatin emulsion layer containing yellow coupler.
7th layer—Gelatin protective layer.

Apart from the above, the comparison samples (1) and (3), and the referential samples having been added quantity to that of triazine derivative of (a). (a) is added and then (b) is added.
(The hardening method as described in the Japanese Patent Publication No. 48-13709)

Hardening agent of this invention (6)
Aqueous solution of the preparation example 5.

Hardening agent of this invention (7)
Aqueous solution which 2,2'-(oxydiethylenedioxy)-bis[4,6-dichloro-s-triazine] was partially hydrolyzed similar to the preparation example 1.

Hardening agent of this invention (8)
Aqueous solution which 2,2'-(thioethylenedioxy)-bis[4,6-dichloro-s-triazine] was partially hydrolyzed similar to the preparation example 2.

The respective hardening extents of every samples was measured in the similar manner to that of the example 1. As for the measurements of the photographic characteristics thereof, the color developing process was made by the color developer of which principal ingredient is 4-amino-3-methyl-N-ethyl-N-hydroxyethylanilinesulfate at 38° C. for 3 minutes of time after wedge-exposure was made to white light, and then the sensitometry was done after following the ordinary manners of bleaching, fixing and washing. The results of those processes is shown in the Table 2. And, the sensitivities shown wherein represent the relative values to that the sensitivity of the referential sample (the sample No. 9) is regarded as 100 in the sensitometry that was done through the filters for each color. Further, B, G and R shown in the Table 2 represent that the sensitometries were made by measuring the color densities through blue, green and red filters respectively.

except that the occurrence of remarkable damage on the film surface was found in the sample material No. 9.

TABLE 2

| Sample No. | Added hardening agent | Adding amt. mili mol g gelatin | Hardening properties | | | | | | | | | | Photographic characteristics | | | | | |
|---|---|---|---|---|---|---|---|---|---|---|---|---|---|---|---|---|---|---|
| | | | Starting time for dissolution (min.) | | | | | Strength of layer surface (g) | | | | | Sensitivity | | | Fog | | |
| | | | 1 day preservation | 3 days preservation | 7 days preservation | 14 days preservation | 3 days heat-treatment | 1 day preservation | 3 days preservation | 7 days preservation | 14 days preservation | 3 days heat-treatment | B | G | R | B | G | R |
| 9 | — | — | 0.5 | 0.5 | 0.5 | 0.5 | 1.0 | 2 | 2 | 2 | 3 | 4 | 100 | 100 | 100 | 0.10 | 0.10 | 0.14 |
| 10 | Comparison hardening agent (1) | 0.05 | 5 | 7 | 12 | 15 | 23 | 35 | 50 | 80 | 140 | 205 | 90 | 88 | 86 | 0.08 | 0.08 | 0.12 |
| 11 | Comparison hardening agent (3) | 0.05 | 10 | 17 | 23 | 26 | 30 over | 90 | 180 | 230 | 255 | 290 | 92 | 91 | 89 | 0.08 | 0.08 | 0.11 |
| 12 | Hardening agent of this invention (2) | 0.05 | 30 over | 30 over | 30 over | 30 over | 30 over | 380 | 380 | 380 | 380 | 380 | 96 | 92 | 91 | 0.07 | 0.08 | 0.10 |
| 13 | Hardening agent of this invention (6) | 0.05 | 30 over | 30 over | 30 over | 30 over | 30 over | 405 | 410 | 410 | 410 | 410 | 94 | 93 | 90 | 0.08 | 0.08 | 0.11 |
| 14 | Hardening agent of this invention (7) | 0.05 | 28 | 30 over | 30 over | 30 over | 30 over | 380 | 385 | 390 | 390 | 390 | 92 | 92 | 93 | 0.07 | 0.07 | 0.11 |
| 15 | Hardening agent of this invention (8) | 0.05 | 30 over | 30 over | 30 over | 30 over | 30 over | 395 | 395 | 400 | 400 | 405 | 93 | 94 | 90 | 0.08 | 0.08 | 0.11 |

As is obvious from the Table 2, it proves that the hardening agent of the invention has a superb hardening function without harming the photographic characteristics if applied with a multi-layered color film.

And, the reversal color processing (1st developing, washing, reversal exposure, 2nd developing, washing, bleaching, washing, fixing, and then washing) was also tried on the sample material No. 9, 12, 13, 14 and 15, however, it proved that the film of every sample material maintains satisfactorily and that no special obstacle was found in the photographic characteristics thereof,

EXAMPLE 3

In the similar manner to that of the example 2, a sample material having been added with hardening agent in the gelatin protective layer only, and another one as a referential sample material without adding of hardening agent, were prepared. The hardening extent of every sample material was measured in the similar manner to that of the example 1, and the results thereof are shown in the Table 3.

TABLE 3

| Sample No. | Added hardening agent | Adding amt. mili mol g gelatin | Hardening properties | | | | | | | | | |
|---|---|---|---|---|---|---|---|---|---|---|---|---|
| | | | Starting time for dissolution (min.) | | | | | Strength of layer surface (g) | | | | |
| | | | 1 day preservation | 3 days preservation | 7 days preservation | 14 days preservation | 3 days heat-treatment | 1 day preservation | 3 days preservation | 3 days preservation | 14 days preservation | 3 days heat-treatment |
| 16 | — | | 0.5 | 0.5 | 0.5 | 0.5 | 0.5 | 2 | 2 | 2 | 2 | 3 |
| 17 | Comparison hardening agent (1) | 0.15 | 3 | 6 | 11 | 13 | 19 | 25 | 45 | 70 | 115 | 160 |
| 18 | Comparison hardening agent (3) | 0.15 | 7 | 12 | 18 | 20 | 24 | 40 | 80 | 130 | 155 | 175 |
| 19 | Hardening agent of this invention (2) | 0.15 | 30 over | 30 over | 30 over | 30 over | 30 over | 355 | 360 | 360 | 360 | 360 |
| 20 | Hardening agent of this invention (6) | 0.15 | 28 | 30 over | 30 over | 30 over | 30 over | 370 | 370 | 370 | 370 | 375 |
| 21 | Hardening agent of this invention (7) | 0.15 | 27 | 30 over | 30 over | 30 over | 30 over | 345 | 345 | 345 | 350 | 350 |
| 22 | Hardening agent of this inven- | 0.15 | 30 over | 30 over | 30 over | 30 over | 30 over | 370 | 375 | 380 | 380 | 380 |

TABLE 3-continued

| | | | Hardening properties | | | | | | | | |
|---|---|---|---|---|---|---|---|---|---|---|---|
| | | Adding | Starting time for dissolution (min.) | | | | | Strength of layer surface (g) | | | |
| Sample No. | Added hardening agent | amt. mili mol g gelatin | 1 day preservation | 3 days preservation | 7 days preservation | 14 days preservation | 3 days heat-treatment | 1 day preservation | 3 days preservation | 7 days preservation | 14 days preservation | 3 days heat-treatment |
| | tion (8) | | | | | | | | | | | |

As is obvious from the Table 3, it proves that the hardening agent of the invention has a superb hardening function that the hardening process thereof is made very rapidly and in addition that after-hardening does not substantially exist therein, in comparison with the conventional hardening agents which have been known to the public.

EXAMPLE 4

A referential sample material without containing the hardening agent, and 7 kinds of sample materials containing the hardening agent were prepared in such a manner that the second ripening is done by adding gold and sulfur sensitizer into silver chlorobromide emulsion containing 30% silver bromide, and stabilizer, coating auxiliary and magenta coupler are added in, and thereafter it is divided into 8 portions, of which one portion remains as it is, and in each of the remaining 7 portions thereof, the hardening agents for comparison use, (1), (2) and (3) and the hardening agents of the invention, (1), (5), (9), and (10) are added respectively, and after that, each mixture is coated onto polyethylene laminated paper and then dried up.

Hardening agent of the invention (9)
2,2'-(oxydiethylenedioxy)bis[4,6-dichloro-s-triazine] was partially hydrolyzed in the similar manner to that of the preparation example 2.

Hardening agent of the invention (10)
Aqueous solution that 1,4-bis(4,6-dichloro-s-triazine-2-yl oxymethyl)cyclohexane was partially hydrolyzed in the similar manner to that of the preparation example 2.

With each of the sample materials, the hardening characteristics thereof was measured by the similar method as described in the example 1 and the color developing process was respectively made by the color developer of which the principal ingredient is 4-amino-3-methyl-N-ethyl-N-($\beta$-methylsulfoneamideethyl)m-aniline sulfate, at 30° C. for 3 minutes 30 seconds of time, and, bleaching, fixing and washing were done successively and then the sensitometry was made. The results of the above is shown in the Table 4. And, the said sensitometry was made by the measurement of reflection density through a green filter, and the sensitivities shown in the Table indicate the relative value to that the sensitivity of the referential sample material (sample material No. 23) is regarded as 100.

TABLE 4

| | | | Hardening properties | | | | | | | | | | Photographic characteristics | |
|---|---|---|---|---|---|---|---|---|---|---|---|---|---|---|
| | | | Starting time for dissolution (min) | | | | | Strength of layer surface (g) | | | | | | |
| Sample No. | Added hardening agent | Adding amt. mili mol g gelatin | 1 day preservation | 3 days preservation | 7 days preservation | 14 days preservation | 3 days heat-treatment | 1 day preservation | 3 days preservation | 7 days preservation | 14 days preservation | 3 days heat-treatment | Sensitivity | Fog |
| 23 | — | — | 0.5 | 0.5 | 0.5 | 0.5 | 0.5 | 2 | 2 | 2 | 2 | 2 | 100 | 0.05 |
| 24 | Comparison hardening agent (1) | 0.05 | 3 | 5 | 8 | 12 | 16 | 10 | 20 | 55 | 80 | 110 | 93 | 0.04 |
| 25 | Comparison hardening agent (2) | 0.1 | 10 | 16 | 22 | 26 | 30 over | 30 | 50 | 95 | 130 | 150 | 95 | 0.04 |
| 26 | Comparison hardening agent (3) | 0.05 | 6 | 11 | 15 | 18 | 21 | 25 | 45 | 80 | 100 | 135 | 94 | 0.05 |
| 27 | Hardening agent of this invention (1) | 0.05 | 28 | 30 over | 30 over | 30 over | 30 over | 185 | 190 | 190 | 190 | 190 | 97 | 0.04 |
| 28 | Hardening agent of this invention (5) | 0.033 | 30 over | 30 over | 30 over | 30 over | 30 over | 180 | 185 | 200 | 200 | 200 | 96 | 0.04 |
| 29 | Hardening agent of this invention (9) | 0.05 | 30 over | 30 over | 30 over | 30 over | 30 over | 205 | 205 | 205 | 205 | 210 | 97 | 0.04 |
| 30 | Hardening agent of this invention (10) | 0.05 | 29 | 30 over | 30 over | 30 over | 30 over | 195 | 195 | 195 | 195 | 200 | 98 | 0.04 |

As is obvious from the Table 4, it proves that the hardening agent of the invention has a superb hardening function that the photographic characteristics are not damaged, and in addition that the hardening process thereof is remarkably faster than that of the conventional hardening agents which have already been known to the public, and that afterhardening function thereof does not exist substantially.

What is claimed is:

1. A method for hardening a gelatin comprising reacting the gelatin with a partially hydrolyzed product of dichloro-s-triazine derivative represented by the following formula

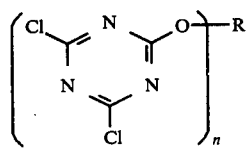

wherein, n is an integer of two or more, R represents a n-valent organic group.

2. A method according to claim 1, wherein R in the formula represents a n-valent aliphatic group, aromatic group, 5 or 6-membered heterocyclic group containing a nitrogen, oxygen or sulfur atom, or 5 or 6-membered alicyclic group or a combination thereof.

3. A method according to claim 1, wherein n is 2, 3 or 4.

4. A method according to claim 2, wherein, R represents a n-valent aliphatic group having 2–10 carbon atoms containing a nitrogen, at least one of a n-valent oxygen and sulfur atom, a 5 or 6-membered alicyclic group or a n-valent benzene or naphthalene group.

5. A method according to claim 4, wherein n is 2 and R represents an alkylene group containing an oxygen atom, a 5 or 6-membered alicyclic group or an m- or o-phenylene group.

* * * * *